(12) United States Patent
Koga et al.

(10) Patent No.: US 6,501,050 B2
(45) Date of Patent: Dec. 31, 2002

(54) FUEL HEATING CONTROL METHOD AND SYSTEM

(75) Inventors: Nobuhiko Koga, Auderghem (BE); Keizo Hiraku, Susono (JP); Hideki Suzuki, Chita-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/989,443

(22) Filed: Nov. 21, 2001

(65) Prior Publication Data
US 2002/0060213 A1 May 23, 2002

(30) Foreign Application Priority Data

Nov. 22, 2000 (JP) ........................................ 2000-355952

(51) Int. Cl.[7] .................................................. B60L 1/02
(52) U.S. Cl. ........................ 219/205; 219/202; 219/509
(58) Field of Search ................................. 219/205, 202, 219/509, 270; 123/549, 594

(56) References Cited

U.S. PATENT DOCUMENTS

| 4,242,999 A | * | 1/1981 | Hoser ........................... 123/547 |
| 4,348,583 A | * | 9/1982 | Bube et al. ............. 123/179.21 |
| 4,423,307 A | * | 12/1983 | Kondo et al. .......... 123/142.5 E |
| 4,506,145 A | * | 3/1985 | Kawamura et al. ..... 123/179.21 |
| 4,748,960 A | * | 6/1988 | Wolf ............................ 123/549 |
| 4,790,285 A | * | 12/1988 | Wolf ............................ 123/549 |
| 4,823,757 A | * | 4/1989 | Redele ......................... 123/381 |
| 5,257,501 A | * | 11/1993 | Wataya ................... 123/179.21 |
| 5,553,451 A | * | 9/1996 | Harada ......................... 60/277 |
| 5,894,832 A | * | 4/1999 | Nogi et al. ............. 123/179.15 |
| 6,009,369 A | * | 12/1999 | Boisvert et al. ......... 123/145 A |
| 6,083,369 A | * | 7/2000 | Tanigawa .................... 204/424 |

FOREIGN PATENT DOCUMENTS

| JP | A 5-288131 | 11/1993 |
| JP | A 7-27035 | 1/1995 |
| JP | A 11-148441 | 6/1999 |

OTHER PUBLICATIONS

Frank Zimmerman et al.; "An Internally Heated Tip Injector to Reduce HC Emissions During Cold–Start"; Society of Automotive Engineers, Inc. 1999.

* cited by examiner

Primary Examiner—Teresa Walberg
Assistant Examiner—Vinod D Patel
(74) Attorney, Agent, or Firm—Oliff & Berridge, PLC

(57) ABSTRACT

A fuel heating control method and apparatus includes an operation of a heater heating a fuel for an engine started by being driven by a starting motor. The heater is not operated until after an operation of the starting motor is substantially terminated at a time of starting the engine.

16 Claims, 7 Drawing Sheets

FUEL HEATING CONTROL METHOD AND SYSTEM

INCORPORATION BY REFERENCE

The disclosure of Japanese Patent Application No. 2000-355952 filed on Nov. 22, 2000 including the specification, drawings and abstract is incorporated herein by reference in its entirety.

BACKGROUND OF THE INVENTION

1. Field of Invention

The invention relates to an engine of a vehicle such as a motor vehicle, and more particularly to a control relating to heating a fuel supplied to an engine.

2. Description of Related Art

In an engine of a vehicle, such as a motor vehicle, it has been a common practice to provide an electric heater at a fuel injection valve, that injects a fuel into an engine combustion chamber, for heating the fuel injection valve to inject thus heated fuel. Further, there have been suggested various kinds of inventions which improve durability of the heater by preventing overheat thereof and which control heating of the fuel by the heater based on a temperature of atmospheric air and the engine or a combustion state of the fuel or the like. Examples of the inventions mentioned above are disclosed in Japanese Patent Application Laid-open Nos. 5-288131, 11-148441, and the like.

These conventionally given suggestions correspond to inventions relating to how heating of the fuel should be controlled according to the temperature of the atmospheric air and the engine or the combustion state of the fuel or the like, exclusively to improve a fuel heating performance of the heater and a durability of the heater or improve a startability of the engine through heating of the fuel by the heater.

In the engine provided with the heater for heating the fuel, conventionally in general, application of electric current to both of a motor for starting the engine and the heater for heating the fuel is simultaneously started at a time of starting the engine. This is because heating of the fuel by the heater improves a startability when the engine is cold, and this operation is as a matter of course when consideration is given to improvement of an exhaust property at a time of starting the engine under a cold temperature. It is true that in view of the object and effect of the heater operation, it can be considered that the heater is started at the same time the engine is started.

However, the above-mentioned heater for heating the fuel consumes a lot of electric power for operation, and the consumed electric power corresponds to a significantly heavy load for an electric power storage device having a limited capacity. Accordingly, in the case of operating the heater for heating the fuel at the same time driving of the engine is started by the motor for starting the engine, two heavy loads are simultaneously applied to the electric power storage device having a limited capacity. This reduces an electric power supply to each of the loads (the motor for starting the engine and the heater for heating the fuel). Accordingly, on one hand, a driving revolution for starting the engine is decreased, thereby delaying the engine to start running on its own, and on the other hand, a degree of heating the fuel by the heater is reduced, thereby delaying the engine to start running on its own and prolonging a discharge of unburned content at start-up, so that a synergistically adverse effect is generated with respect to an improvement of the engine startability and controlling of unburned content emitted at start-up. This becomes conspicuous at a time when a storage state of the electric power storage device is lowered, and a specific attention will be necessary.

SUMMARY OF THE INVENTION

The invention has been made by focusing attention on the fact that there is a risk that an adverse result may be brought about with respect to an object and an operation and effect of a heater for heating a fuel in an engine depending on operating periods of the heater. An object of the invention is to improve an operating period control of the heater for heating the fuel.

In accordance with one exemplary aspect of the invention, there is provided a method for controlling an operation of a heater for heating a fuel in an engine started by being driven by a starting motor, in which the operation of the heater is started after the operation of the starting motor is substantially terminated at a time of starting the engine.

In the exemplary aspect mentioned above, the operation of the starting motor may be substantially terminated at a time when a switch of a power circuit in the starting motor is opened.

Further, in the above exemplary aspect, the operation of the starting motor may be substantially terminated at a time when the engine is first able to run on its own.

Figure 1:
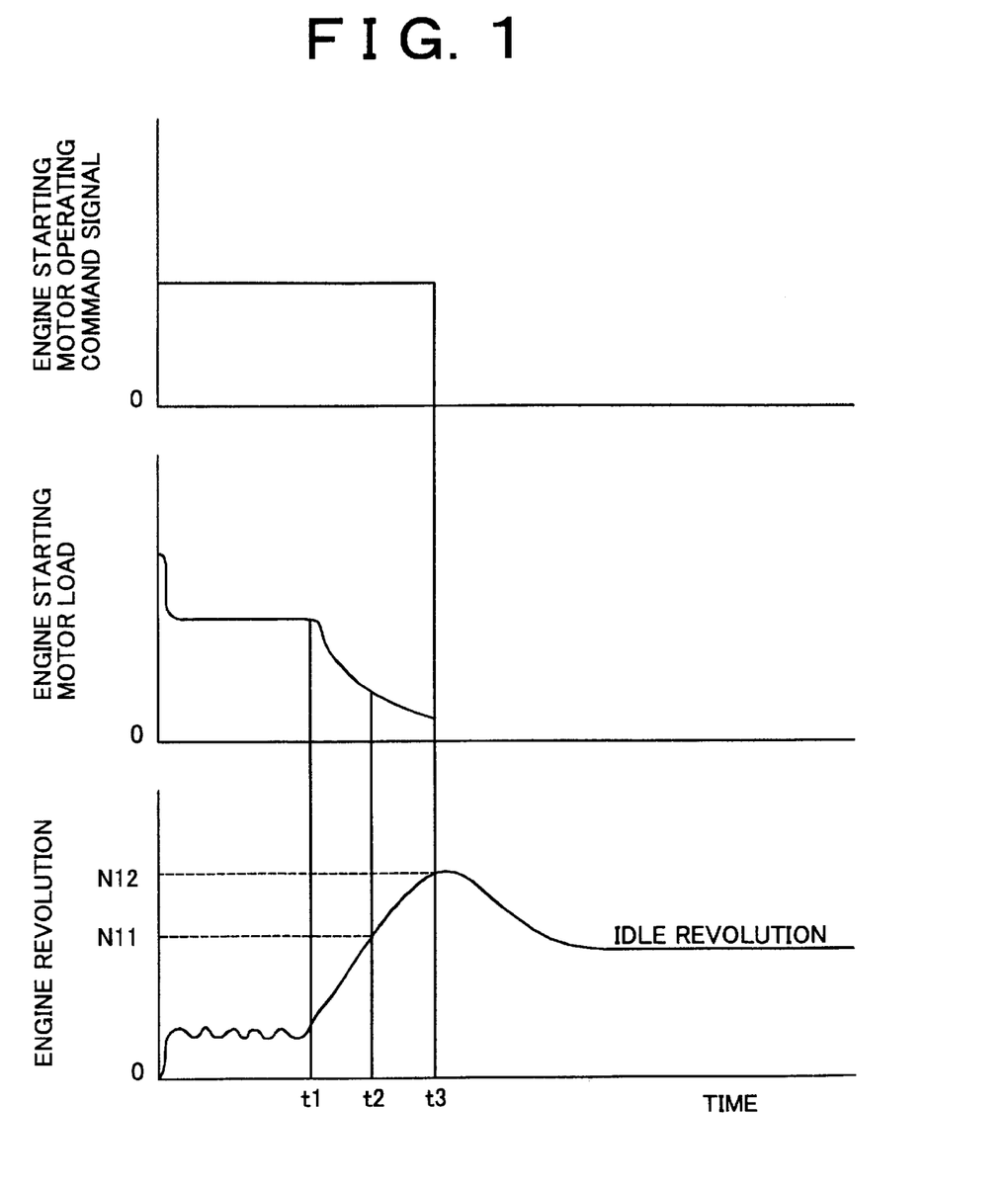
FIG. 1 is a graph showing an example of an operation command given to an engine starting motor, a load of the motor, and a start-up of an engine revolution at a time of an engine start.

It is true that a startability of the engine under cold temperature is improved by heating the fuel by the heater. However, considering an improvement of the engine startability by the fuel heating in more detail, it can be seen that the fuel heating actually becomes effective at a time when the engine is able to run on its own and the operation thereof is to be stabilized through warm-up. The respective elapses of an engine starting motor operating command signal, an electric power consumption of the motor and an engine revolution at a time of starting the engine are generally as shown in FIG. 1. In a normal engine start, the engine is able to run on its own at a time t1 which is less than 1 second after driving of the engine is started by the motor, and thereafter, the engine revolution is increased by the power of the engine itself. On the contrary, with respect to the heating of the fuel by the heater, even when the heater is provided at a fuel injection valve closest to an injection end of the fuel, a time delay exceeding 1 second is generated until the heat generated by an electric current application is substantially transmitted to the fuel, because the heater itself and the fuel injection valve have a considerable heat capacity. Accordingly, even if the electric current application to the heater is started at the same time the electric current application to the motor is started, the fuel injected before the engine is able to run on its own would be barely heated.

Accordingly, it is assumed that the engine is able to run on its own when driven at a predetermined revolution or more until a predetermined times even when the engine is cold without the fuel being particularly heated at that time. Further, if the fuel is heated after the engine becomes capable of running on its own, an improved fuel explosion can be obtained and the engine can start up more rapidly and more smoothly. Further, if the fuel is heated during the time, it is possible to prevent the fuel from attaching to a wall surface of a combustion chamber, a start-up operation of the engine can be performed at stoichiometric air fuel ratio, and an exhaust property at a time of starting the engine can be improved. Accordingly, when the engine is driven by the motor, it is preferable to restrict the electric current application to the heater, increase an amount of electric current application to the motor as much as possible, increase an engine driving revolution by the motor, and ensure that the engine is able to run on its own at an early stage.

If a time, when the operation of the starting motor is substantially terminated, for starting the electric current application to the heater is set to a time when the switch of the power circuit for applying an electric current to the starting motor is opened, as a time t3 shown in FIG. 1, it is possible to securely prevent the motor load and the heater load from being simultaneously applied to the electric power storage device. However, in this case, when the electric current application to the motor is executed for a time longer than necessary, there is a problem that the operation start of the heater is delayed more than necessary.

On that point, if a time when the operation of the starting motor is substantially terminated is set to a time when the engine becomes capable of running on its own, it is possible to avoid the problem that the operation start of the heater is delayed more than necessary due to the electric current application to the motor being executed for a time longer than necessary as mentioned above. In this case, the engine is judged to be capable of running on its own at a time when self-running of the engine has progressed at a certain degree to be sure, whereby the engine driving load applied to the motor is largely reduced and the operation of the motor is not completely terminated but substantially terminated, as at a time t2 shown in FIG. 1. Accordingly, when the electric current application to the heater is started, the switch of the motor power circuit is still closed, and even if a state occurs where the load of the motor and the load of the heater are simultaneously applied to the electric power storage device, the load applied by the motor has been already largely reduced. Therefore the heater can immediately obtain a strong electric current from the electric power storage device to operate.

In the exemplary aspect mentioned above, the operation of the heater can be such that a plurality of heaters with respect to all the cylinders are simultaneously started operating upon substantial termination of the operation of the starting motor. Further, when a plurality of heaters are separated into groups, the operation of the heaters may be started step by step by each group upon substantial termination of the starting motor.

In this case, if the heaters with respect to all the cylinders are separated into a plurality of groups and the operation of the heaters can be started step by step by each group, even in the case that the operation of the heater is started at a time when the operation of the motor is not yet completely terminated as mentioned above, it is possible to better avoid the load increase caused by the overlapped loads by starting the operation of the heaters step by step by each group.

BRIEF DESCRIPTION OF THE DRAWINGS

The invention will be described with reference to the following drawings in which like reference numerals describe like elements and wherein.

DETAILED DESCRIPTION OF PREFERRED EMBODIMENTS

Figure 2:
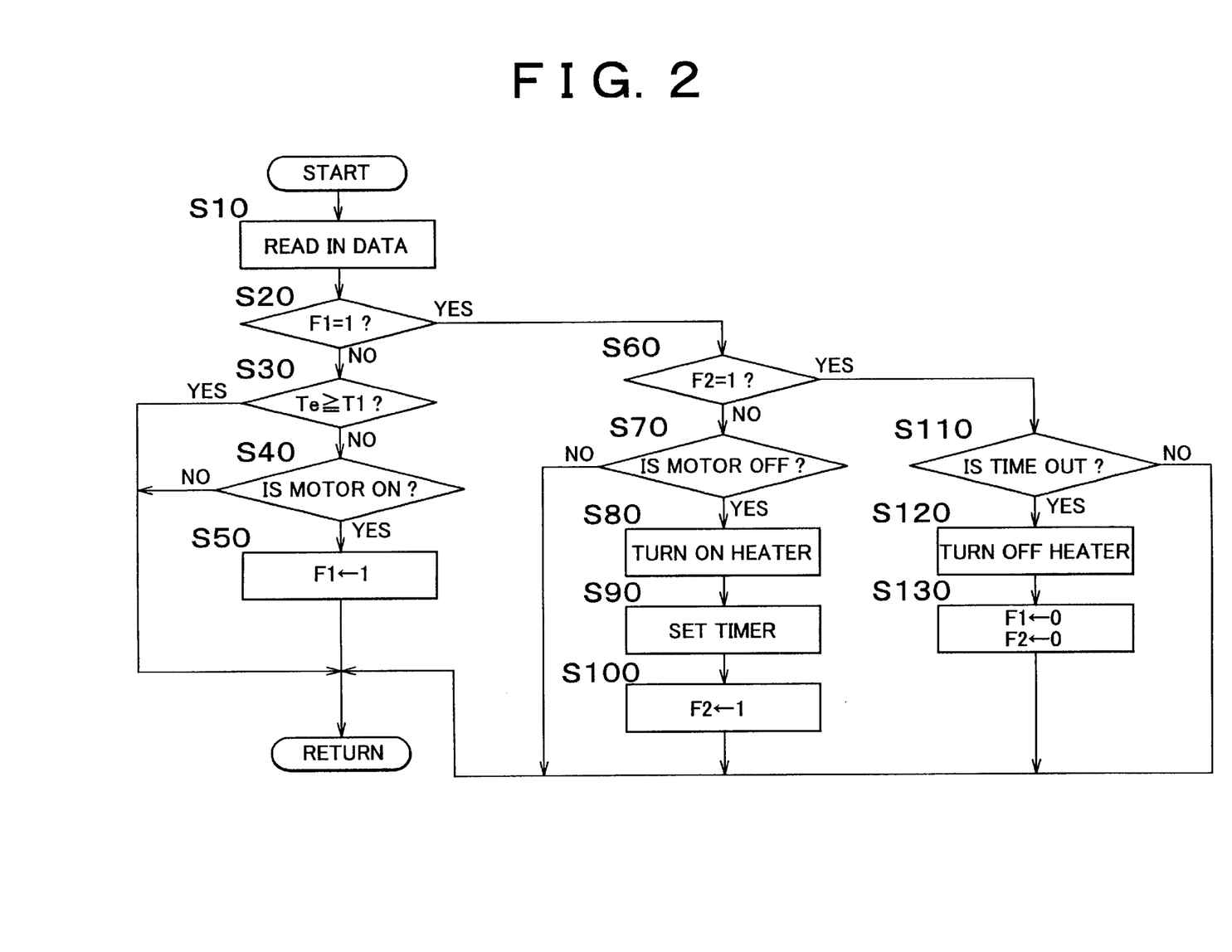
FIG. 2 is a flow chart showing a first embodiment of a fuel heating control method in accordance with the invention as a flow of control steps.

FIG. 2 is a flow chart showing the first embodiment of a fuel heating control method at a time of starting an engine in accordance with the invention as a flow of control steps. When the control is initiated, first in step 10, an engine temperature Te detected by an engine cooling water temperature or the like, an engine revolution Ne, an operation command output to an engine starting motor, and other data are read in. Next, the control goes to step 20, and it is judged whether a flag F1 is 1. The flag F1 is reset to 0 at a time of starting a normal control. Since the F1 is 0 at a time when the control comes to step 20 for the first time, the control goes to step 30.

In step 30, it is judged whether the engine temperature Te read in step 10 is higher than a predetermined threshold value T1. The threshold value T1 corresponds to an engine temperature value indicating that the engine is in a warmed-up state requiring no operation of the heater at a time of starting the engine. When the judgement in step 30 is yes, the operation of the heater is not required, so that the control immediately returns to START, and waits until the heater operation is required while repeating the read-in of the data. When the judgement in step 30 is no, the control goes to step 40, and it is judged whether an operation command for the engine starting motor is output (the motor is turned on). In the case that the judgement in step 40 is no, the control returns to START.

When the judgement in step 40 turns to yes, the control goes to step 50, sets 1 to the flag F1 and thereafter returns to START. Thereafter, since the judgement in step 20 is yes, the control goes to step 60 from step 20. In step 60, it is judged whether a flag F2 is 1. The flag F2 is also reset to 0 at a time of starting the control. When the control initially comes to step 60, the judgement in step 60 is no, and the control goes to step 70. In step 70, it is judged whether the operation command output to the engine starting motor is cancelled (the motor is turned off). In the case that the judgement in step 70 is no, the control returns to START, and a cranking of the engine is continued as it is by the motor.

In the meantime, the operation command applied to the engine starting motor is cancelled, and when the judgement in step 70 turns to yes, the control goes to step 80. In step 80, the electric current application to a heater for heating the fuel is started (the heater is turned on). Conventionally, in general, a control for turning off the engine starting motor is executed based on the engine revolution. This is normally executed as exemplified in FIG. 1 at a time when the engine revolution reaches a revolution N12 somewhat higher than an idle revolution. In this case, the engine revolution temporarily increases above the idle revolution as mentioned above when the engine is able to run on its own by the motor drive, because a driving force of the motor is applied to the engine in addition to a self-rotation of the engine. However, a drive torque applied from the motor to the engine is rapidly reduced in correspondence to an increase of the revolution due to the self-running of the engine. Accordingly, despite the increase of the driving revolution of the motor, an electric power load of the motor corresponding to a product of the driving torque and the driving revolution is rapidly reduced in correspondence to the progress of the self-running of the engine, as exemplified in FIG. 1.

A Heater On Control in step 80 is executed by setting a time when the switch in the power circuit of the engine starting motor is opened to a time when the operation of the engine starting motor is substantially terminated, and setting the time t3 shown in FIG. 1 to a time when the operation of the heater is started. After the heater is turned on in step 80, a timer is set in step 90. The timer may be provided with a computer, and may be provided in a part of an electric vehicle driving control apparatus controlling operations of various apparatuses including the starting motor and the heater. Next, in step 100, the flag F2 is set to 1, and the control returns to step 10. The control returned to step 10 goes to step 110 via step 20 and step 60. In step 110, it is judged whether a heater operating time set by the timer has passed a predetermined time (time out). Further, when the heater is operated for the predetermined time, the judgement of step 110 turns to yes, the control goes to step 120, and the operation of the heater is stopped (the heater is turned off). Accordingly, the operation of the heater is continued for the predetermined time. Thereafter, in step 130, the flags F1 and F2 are reset to 0, and one cycle of fuel heating control at a time of starting the engine is terminated.

Figure 3:
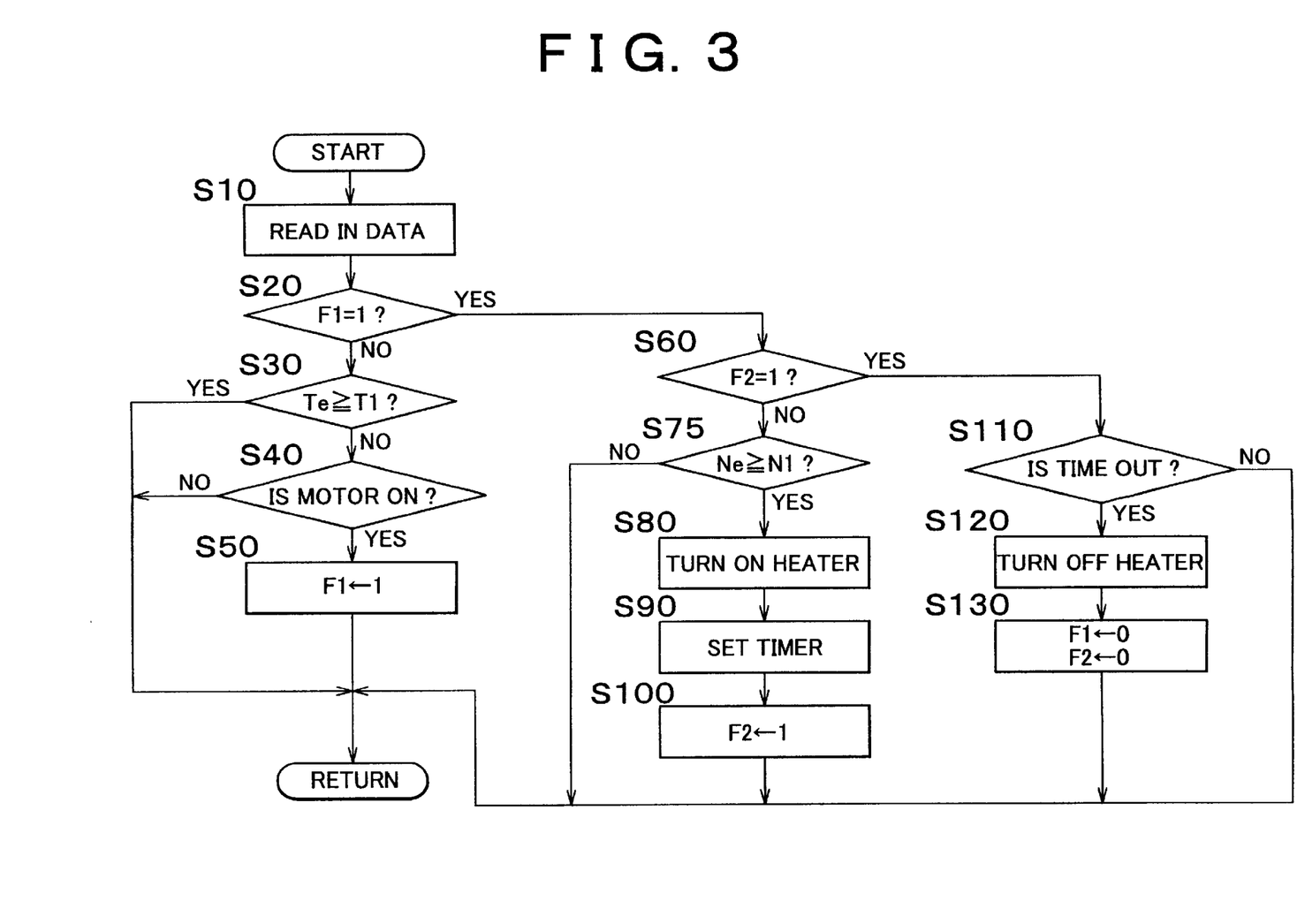
FIG. 3 is a flow chart similar to that of FIG. 2, showing a second embodiment of the fuel heating control method in accordance with the invention.

FIG. 3 is a flow chart based similar to that in FIG. 2, showing the second embodiment of a fuel heating control method at a time of starting an engine in accordance with the invention. In FIG. 3, the steps corresponding to the steps shown in FIG. 2 are shown by assigning the same step numbers as the step numbers in FIG. 2 to the steps in FIG. 3. In this embodiment, in step 75 which is provided in place of step 70 in accordance with the first embodiment shown in FIG. 2, it is judged whether an engine revolution Ne is increased to a level equal to or more than a predetermined threshold value N1. The threshold value N1 may be set to an engine revolution for stopping the operation of the engine starting motor as N12 shown in FIG. 1, however, it may also be set to such a value as N11 indicating that the engine revolution is surely on the increase already due to the fact that the engine has become capable of running on its own. Accordingly, the operation of the heater is started earlier only by t3–t2. In this case, the motor is not yet turned off when the heater is turned on, however, the motor has substantially terminated the operation thereof, and the load of the motor applied to the electric power storage device is largely reduced. Accordingly, even if the heater is turned on at this time, this does not mean that a large load is applied to the electric power storage device in an overlapping manner, so that there is no risk that a synergistically adverse effect is generated with respect to the improvement of the engine startability and the controlling of unburned content emitted at start-up.

Figure 4:
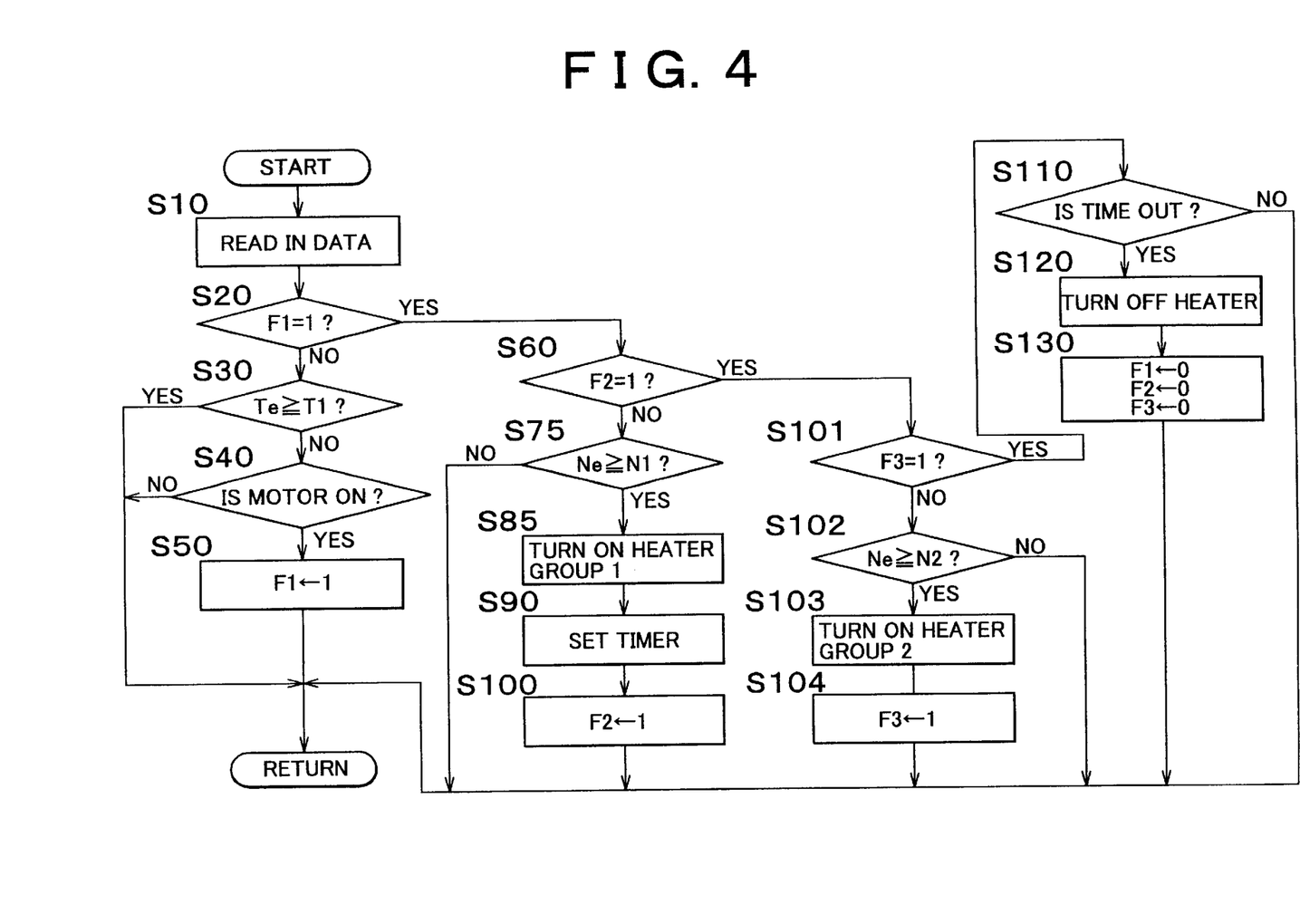
FIG. 4 is a flow chart similar to that of FIG. 3, showing a third embodiment of the fuel heating control method in accordance with the invention.

FIG. 4 is a flow chart similar to that in FIG. 3, showing the third embodiment of a fuel heating control method at a time of starting an engine in accordance with the invention. In FIG. 4, the steps corresponding to the steps shown in FIG. 3 are shown by assigning the same step numbers as the step numbers in FIG. 3 to the steps in FIG. 4. In this embodiment, instead of turning on all of the plurality of heaters with respect to all the cylinders in step 80 in FIG. 3, only heaters in a heater group 1 are turned on in step 85.

Figure 5:
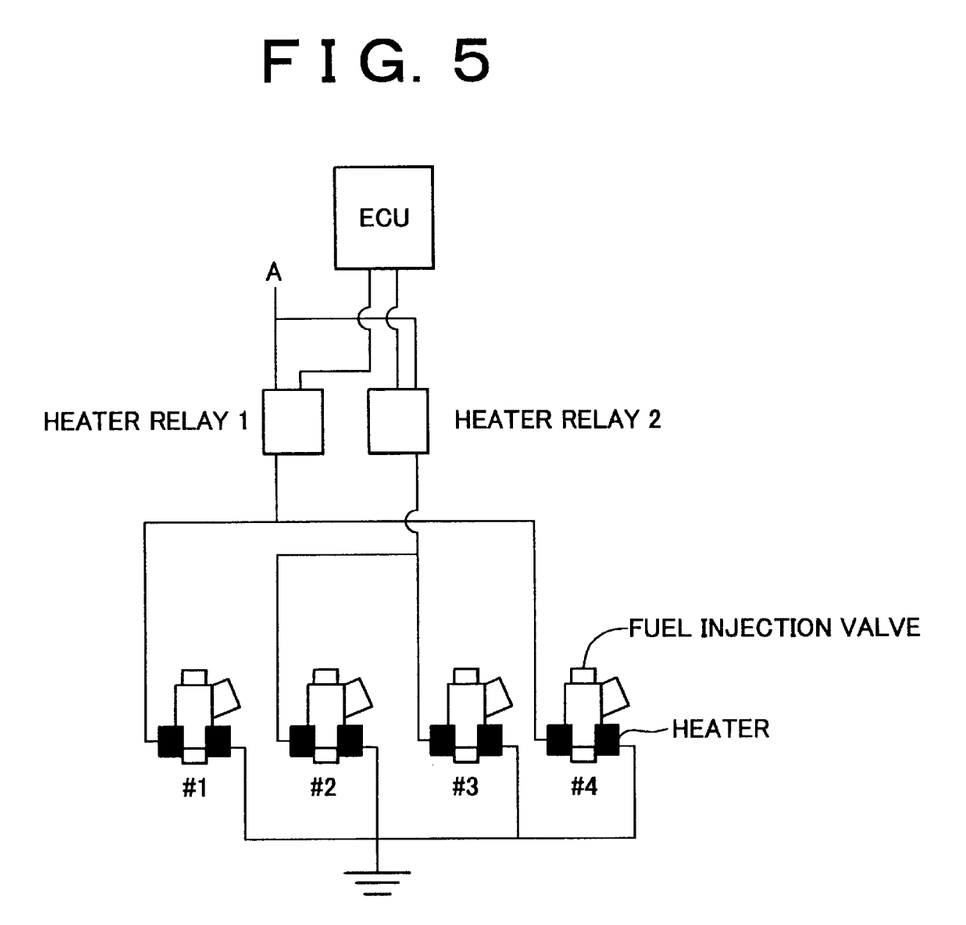
FIG. 5 is a view showing a first example in which a plurality of heaters with respect to all the cylinders are separated into a plurality of heater groups, and electric current applications to the heater groups are respectively controlled by independent relays.
Figure 6:
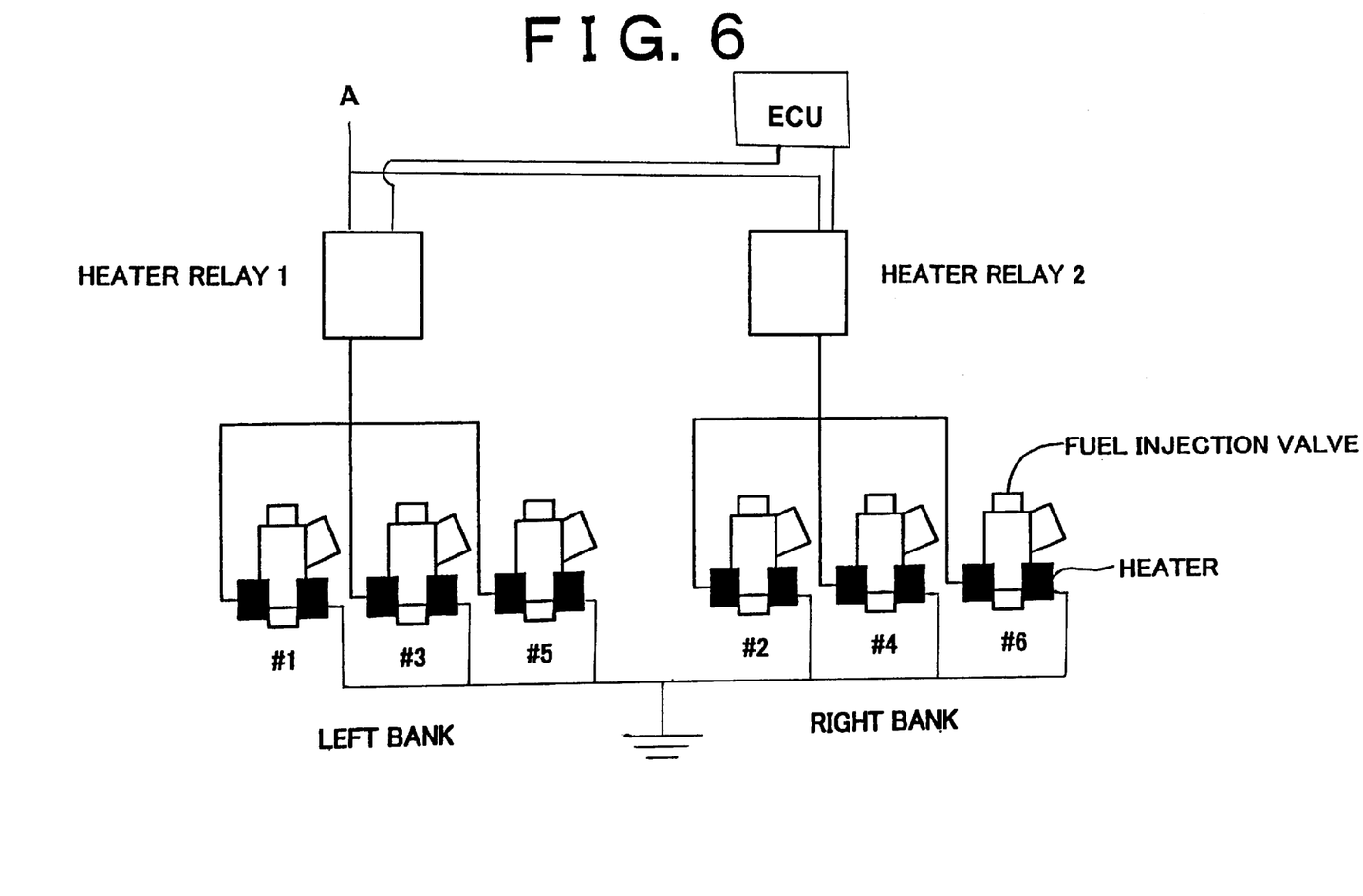
FIG. 6 is a view showing a second example in which a plurality of heaters with respect to all the cylinders are separated into a plurality of heater groups, and electric current applications to the heater groups are respectively controlled by independent relays.
Figure 7:
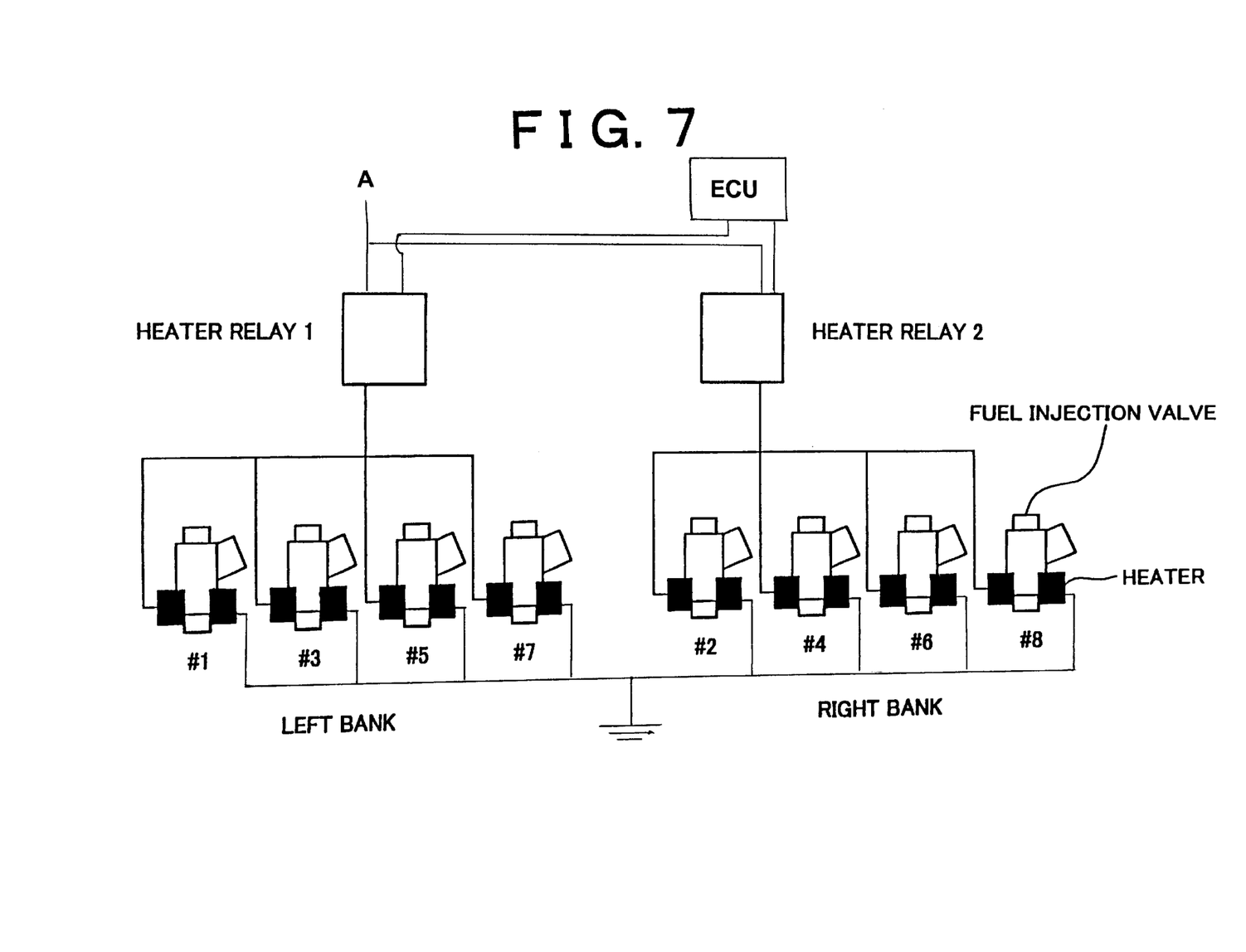
FIG. 7 is a view showing a third example in which a plurality of heaters with respect to all the cylinders are separated into a plurality of heater groups, and electric current applications to the heater groups are respectively controlled by independent relays.

In this case, a plurality of heaters with respect to all the cylinders are separated into a plurality of heater groups exemplified in FIGS. 5 to 7, and the electric current applications of the respective heater groups are structured such as to be respectively controlled by independent relays. FIG. 5 shows an example with respect to a 4-cylinder engine. In this example, the heaters with respect to the fuel injection valves in the first and fourth cylinders are connected to each other in parallel, and the heaters with respect to the fuel injection valves in the second and third cylinders are connected to each other in parallel, thereby respectively constituting the heater groups to which an electric current from an electric power storage device A is selectively supplied in a lump based on a command from an electric vehicle driving control apparatus ECU by heater relays 1 and 2. FIGS. 6 and 7 show examples of structures of heater groups for a 6-cylinder engine and an 8-cylinder engine in a similar way in a somewhat simplified manner. The heater groups 1 and 2 mentioned above and below may be constituted by any one of two groups.

In step 100, after the flag F2 is set to 1, the control goes to step 101 from step 60, and it is judged whether a flag F3 is 1. The flag F3 is reset to 0 at a time of starting the control. When the control comes to step 101 for the first time, the judgement in step 101 is no. Accordingly, the control goes to step 102. Further, in step 102, it is judged whether the engine revolution Ne has increased to a level equal to or more than a second threshold value N2 greater than N1. In this embodiment, when the engine revolution Ne is compared with the threshold value N1 in step 75 corresponding to step 75 of the second embodiment shown in FIG. 3, N1 may be set to a value corresponding to N12 or N11 in FIG. 1, in the same manner as the second embodiment shown in FIG. 3. In particular, when the N1 is set to such a value as N11 and the N2 is set to such a value as N12, the operation of the heaters in the heater group 1 is started at a time when the engine revolution increases to such a value as N11, and thereafter the operation of the heaters in the heater group 2 is executed at a time when the engine revolution increases to such a value as N12. As mentioned above, in the case that a plurality of heaters with respect to all the cylinders are separated into a plurality of groups and they are operated step by step, even when the heater operation is started at a time where the electric current application to the motor has not yet been stopped, such as the time t2 shown in FIG. 1, it is possible to better harmonize switch over of the load from the motor operation to the heater operation.

After starting the operation of the heater group 2 in step 103, the flag F3 is set to 1 in step 104, thereafter the control goes to step 110 from step 101, and the control is terminated based on the time out of the timer in the same manner as that of the second embodiment.

In the illustrated embodiment, the controller (the electric vehicle driving control apparatus ECU) is implemented as a programmed general purpose computer. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A method of controlling an operation of a heater that heats a fuel in an engine started by a starting motor, comprising:

operating the heater after an operation of the starting motor is substantially terminated at a time of starting the engine.

2. The method according to claim 1, wherein the operation of the starting motor is substantially terminated at a time when a switch of a power circuit in the starting motor is opened.

3. The method according to claim 1, wherein the operation of the starting motor is substantially terminated at a time when the engine is first able to run on its own.

4. The method according to claim 3, wherein the engine is first able to run on its own in less than one second after driving of the engine is started by the starting motor.

5. The method according to claim 1, wherein a plurality of heaters with respect to all cylinders of the engine are separated into groups, and the operation of the heaters is started sequentially by each group upon substantial termination of the starting motor.

6. The method according to claim 1, wherein the operation of the starting motor is substantially terminated at a time when an engine revolution is equal to or greater than a predetermined threshold value.

7. The method according to claim 1, wherein when the engine is driven by the starting motor, an amount of electric current application supplied to the heater is restricted, an amount of electric current application supplied to the starting motor is increased as much as possible, and an engine drive revolution by the starting motor is increased as much as possible such that the engine is able to run on its own at an early stage.

8. The method according to claim 1, wherein when the engine is judged to be capable of running on its own at a time when self-running of the engine is progressed to a certain degree, the engine driving load applied to the starting motor is reduced and the operation of the starting motor is substantially terminated.

9. A fuel heating apparatus, comprising:

an engine;

a heater that heats a fuel in the engine;

a starting motor that starts the engine; and a controller that operates the heater after an operation of the starting motor is substantially terminated at a time of starting the engine.

10. The apparatus according to claim 9, wherein the operation of the starting motor is substantially terminated by the controller at a time when a switch of a power circuit in the starting motor is opened.

11. The apparatus according to claim 9, wherein the operation of the starting motor is substantially terminated by the controller at a time when the engine is first able to run on its own.

12. The apparatus according to claim 11, wherein the engine is first able to run on its own in less than one second after driving of the engine is started by the starting motor.

13. The apparatus according to claim 9, wherein a plurality of heaters with respect to all cylinders of the engine are separated into groups, and the operation of the heaters is started by the controller sequentially by each group upon substantial termination of the starting motor.

14. The apparatus according to claim 9, wherein the operation of the starting motor is substantially terminated by the controller at a time when an engine revolution is equal to or greater than a predetermined threshold value.

15. The apparatus according to claim 9, wherein when the engine is driven by the starting motor, an amount of electric current application supplied to the heater is restricted, the amount of electric current application supplied to the starting motor is increased as much as possible, and an engine drive revolution by the starting motor is increased as much as possible such that the engine is able to run on its own at an early stage.

16. The apparatus according to claim 9, wherein when the engine is judged to be capable of running on its own by the controller at a time when self-running of the engine is progressed to a certain degree, the engine driving load applied to the starting motor is reduced and the operation of the starting motor is substantially terminated.

* * * * *